United States Patent [19]

Ashe

[11] 3,954,705
[45] May 4, 1976

[54] GRAFT COPOLYMERS HAVING AN ACID ANHYDRIDE COPOLYMER BACKBONE

[75] Inventor: Thomas A. Ashe, Wilmington, Del.

[73] Assignee: E. I. Du Pont de Nemours and Company, Wilmington, Del.

[22] Filed: June 24, 1974

[21] Appl. No.: 482,572

Related U.S. Application Data

[60] Division of Ser. No. 318,505, Dec. 26, 1972, abandoned, which is a continuation of Ser. No. 92,949, Nov. 25, 1970, abandoned.

[52] U.S. Cl. .................. 260/42.57; 260/32.8 R; 260/33.6 UA; 260/42.54; 260/42.52; 260/881; 260/876 R; 260/884; 260/885; 260/886
[51] Int. Cl.² .......................................... C08J 3/20
[58] Field of Search .............. 260/885, 876, 42.54, 260/42.57, 886, 42.52

[56] References Cited
UNITED STATES PATENTS

| | | | |
|---|---|---|---|
| 3,297,787 | 1/1967 | Rubens | 260/859 |
| 3,306,954 | 2/1967 | Moore | 260/886 |
| 3,543,855 | 12/1970 | Blatz et al. | 166/274 |

*Primary Examiner*—Carman J. Seccuro

[57] ABSTRACT

Graft copolymers having
A. a backbone component comprising a copolymer of
1. 0.1% to 20%, by weight of the total polymer, of a cyclic carboxylic acid anhydride of 4–7 carbon atoms, and
2. at least one other copolymerizable ethylenically unsaturated monomer;

and
B. at least one graft component comprising a polymer or copolymer of graft copolymerizable ethylenically unsaturated monomer(s), the graft component, as an entity, having an average solubility parameter of 7.5–9, useful as aids in dispersing pigments.

5 Claims, No Drawings

1

GRAFT COPOLYMERS HAVING AN ACID ANHYDRIDE COPOLYMER BACKBONE

CROSS REFERENCE TO RELATED APPLICATIONS

This application is a Division of application Ser. No. 318,505, filed Dec. 26, 1972, which is a continuation of application Ser. No. 92,949, filed Nov. 25, 1970, both now abandoned.

STATEMENT OF THE INVENTION

This invention relates to graft copolymers. It is more particularly directed to a graft copolymer having A. a backbone component comprising a copolymer of
 1. 0.1% to 20%, by weight of the total polymer, of a cyclic carboxylic acid anhydride of 4–7 carbon atoms, and
 2. at least one other copolymerizable ethylenically unsaturated monomer;

and

B. at least one graft component comprising a polymer or copolymer of graft copolymerizable ethylenically unsaturated monomer(s), the graft component, as an entity, having an average solubility parameter of 7.5–9*.

* Calculated by the method described by P. A. Small in J. Appln. Chem., 3, 71 (1953).

In this graft copolymer, the graft component can also be vinyl acetate.

The invention is also directed to this graft copolymer modified so that the backbone component bears one or more pendant carboxyl groups, amide groups, acid salt groups, amine groups or ester groups.

In the backbone component, the weight ratio of anhydride to other monomer can be 1/1–10, preferably 1/1–3, even more preferably about 1/1.

The weight ratio of graft component to backbone component can be 1–100/1, preferably 5–20/1, even more preferably 5–12/1. The best products have ratios of about 8/1.

Illustrative of copolymerizable ethylenically unsaturated monomers which can be used in the backbone component are Styrene
Substituted styrenes like α-methyl styrene
Acrylonitrile
Vinyl ethers of 3–30 carbon atoms (total)
Ethers of the structure $CH_2=CHCH_2OR$, where R is an alkyl radical of 1–24 carbon atoms
Allyl alcohol
Allyl acetate
Isopropenyl acetate
Stilbene and isostilbene
Methacrylic acid
Methyl methacrylate
Vinyl acetate
Vinyl chloride
Vinylidene chloride Illustrative of graft copolymerizable ethylenically unsaturated monomers which can be used in the graft component are Esters of acrylic and methacrylic acid with alkanols of 1–24 carbon atoms, which may bear functional groups such as —OH, —NH$_2$, —COOH, and epoxide,
Vinyl esters of carboxylic acids of 3–36 carbon atoms,
and
Vinyl acetate.

The backbone component and graft component can also be composed of 3, 4 or even more monomer components, so long as the graft copolymer fits the other definitions of the invention.

The graft copolymers of the invention have weight average molecular weights* of 5,000–150,000, preferably 60,000–100,000, even more preferably about 75,000. For some purposes one might select a copolymer with a molecular weight of 80,000–120,000; 120,000–150,000; 20,000–50,000 or 40,000–80,000. Graft copolymers with molecular weights of 150,000–200,000 may also have advantages in some applications.

* Determined by gel permeation chromotography using a polymethyl methacrylate standard.

The graft copolymers of the invention are useful as aids for dispersing pigments, particularly inorganic pigments, in organic liquids. They are especially useful as aids for dispersing iron oxide pigments in organic liquids and particularly useful for dispersing iron oxide pigments in acrylic lacquers of the type disclosed in U.S. application Ser. No. 6572, filed Jan. 28, 1970.

Illustrative of other pigments which can be dispersed using the graft copolymers of the invention are $TiO_2$, quinacridones, phthalocyanines, carbon black, zinc oxide and antimony oxide.

Pigment dispersions made with graft copolymers of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional paint dispersions. Moreover, a dispersion made with a graft copolymer of the invention can have a significantly higher pigment content while retaining the same degree of fluidity than when conventional aids are used.

The graft copolymers of the invention preferred for this use are those wherein the cyclic carboxylic acid anhydride in the backbone copolymer is maleic anhydride.

Also preferred are those graft copolymers of the invention wherein the other copolymerizable ethylenically unsaturated monomer in the backbone component is styrene, a substituted styrene such as α-methyl styrene, a vinyl ether of 3–30 carbon atoms total, allyl alcohol, or an ether of the structure $CH_2=CHCH_2OR$ where R is an alkyl radical of 1–24 carbon atoms.

Also preferred are the graft copolymers of the invention wherein the ethylenically unsaturated monomer(s) of the graft component is vinyl acetate, an ester of acrylic acid or methacrylic acid with an alkanol of 1–24 carbon atoms, preferably 1–8 carbon atoms, or a vinyl ester of a carboxylic acid of 3–36 carbon atoms.

The graft copolymer of the invention particularly preferred for use in dispersing hydrous iron oxide pigment is one whose backbone is a copolymer of styrene and maleic anhydride and whose graft component is a copolymer of methyl methacrylate and 2-ethylhexyl acrylate.

The graft copolymer whose preparation is shown in Example 1 is most preferred for this use.

PREPARATION OF THE GRAFT COPOLYMERS

Preparation of the graft copolymers of the invention is begun by first preparing a 5–20% (by weight) solution of the backbone copolymer in a organic liquid which will also dissolve the graft copolymer product. Those backbone polymers not available in the marketplace can be prepared according to conventional emulsion or solution polymerization techniques, using the customary catalysts in the usual amounts.

A monomer feed solution which consists of appropriate amounts of suitable monomers and 0.5–2% (by weight of the total solids in the reaction mass) of an initiator is then slowly fed into the reaction mass over a 3-hour period while the reaction mass is stirred at reflux temperature under a nitrogen blanket. Suitable initiators are t.butyl perpivalate, azobisisobutyronitrile, 2,4-dichlorobenzoyl peroxide, lauroyl peroxide and di-t.butyl peroxide.

The mass is kept at reflux temperature, under a nitrogen blanket, with stirring, and 30 minutes after the end of the monomer feed solution addition, 0.1% (by weight of the total solids in the reaction mass) of the same initiator is added; 60 minutes after this another 0.1% of initiator is added; 30 minutes later, still another 0.1% is added.

The reaction mass is then held at reflux temperature under a nitrogen blanket, with stirring, for an additional hour to give a solution of graft copolymer in the organic liquid. Ordinarily this solution contains 40–60% solids.

If one wishes to modify this graft copolymer so that the backbone bears free carboxyl, amide, acid salt, amine or ester groups, he can do so by post-reacting the anhydride groups with appropriate reactants, using standard procedures well within the skill of any polymer chemist.

PREPARATION OF PIGMENT DISPERSIONS

The solution of graft copolymer in organic liquid, just described, can be used directly to prepare pigment dispersions.

Enough of the polymer solution and pigment are mixed together to give a polymer/pigment weight ratio of about 1/2. The resulting mass is ball milled, sand milled, two-roll milled or dispersed in a high-speed disperser.

In the preferred embodiment, the mass is milled for from 30 to 60 minutes on a two-roll mill, heated so that the liquid is driven off.

The pigment-polymer mixture comes from the mill in a dry sheet, which is then broken into small chips. These chips are dissolved in an organic liquid compatible with the paint in which the dispersion is to be used, such as, for example, ketones, esters, aromatic hydrocarbons, or mixtures thereof. Proportions are selected so that this solution contains about one part (by weight) of chip for every 2½ parts of liquid. This solution is then shaken on a paint shaker, and, if any pigment remains undispersed, sand ground.

The resulting mill base is added directly to a paint in an amount that, in the ordinary case, gives a pigment-/binder weight ratio of 5–100/100.

DESCRIPTION OF THE PREFERRED EMBODIMENTS

Those skilled in the art will be able to more easily practice the invention by referring to the following illustrative examples. In the examples, all parts are by weight.

EXAMPLE 1

1. A solution was prepared of

| | |
|---|---|
| Ethyl acetate | 81 parts |
| Styrene/maleic acid copolymer powder (1/1 mole ratio, m.w. 1600) | 9 parts |

This solution was heated to reflux temperature and then covered with a nitrogen blanket.

2. A solution was prepared of

| | |
|---|---|
| Methyl methacrylate | 38.5 parts |
| 2-Ethylhexyl acrylate | 34.4 parts |
| Tertiary butyl perpivalate | 0.6 part |

This solution was added to solution (1) over a 3-hour period while solution (1) was stirred and held at reflux temperature.

Thirty minutes after the end of the 3-hour addition period, a solution of 0.05 part of tertiary butyl perpivalate in 1 part of ethyl acetate was added to the reaction mass, still being stirred and held at reflux temperature.

Sixty minutes after the first addition, another addition of 0.05 part of tertiary butyl perpivalate in one part of ethyl acetate was made, and 30 minutes after that still another similar addition of initiator was made.

The reaction mass was then heated at reflux temperature, with stirring, for an additional hour to give a viscous solution, 46–50% solids, of graft copolymer having a styrene/maleic anhydride 1/1 copolymer backbone and a graft component which is a copolymer of methyl methacrylate and 2-ethylhexyl acrylate. The component unit weight ratios in this product are backbone/methyl methacrylate/2-ethylhexyl acrylate 11/47/42.

For the methyl methacrylate 2-ethylhexyl acrylate monomer charge used in the foregoing procedure, one can substitute equivalent amounts of Ethyl methacrylate
Vinyl acetate
Methyl methacrylate/stearyl methacrylate 72/14 mixture
Methyl acrylate/stearyl methacrylate 68/17 mixture or Methyl methacrylate/2-ethylhexyl acrylate/hydroxyethyl methacrylate 66/13/5 mixture.

Similarly, for styrene in the foregoing procedure one can substitute equivalent amounts of Acrylonitrile
Methyl methacrylate
Vinyl acetate
Vinyl chloride or Vinylidene chloride.

One can also substitute equivalent amounts of itaconic anhydride for the maleic anhydride.

EXAMPLE 2

A mill base was made by blending 236 parts of the resin solution of Example 1 and 189 parts of hydrous ferric oxide pigment.

This mixture was placed in a two-roll mill, one of whose rolls was maintained at 40°C. and the other at 110°C. The mixture was milled for 30 minutes.

The resulting solid sheet was broken into small chips and dissolved in a mixture of 230 parts of xylene and 20 parts of VM and P naphtha.

This mill base was then added to an organosol automotive lacquer of the type shown in U.S. application Ser. No. 6572, filed Jan. 28, 1970. The pigment was well dispersed with no flocculation.

What is claimed is:

1. A pigment dispersion consisting essentially of
   A. a graft copolymer having
      1. a backbone component comprising a copolymer of
         a. 0.1%–20%, by weight of the total polymer, of a cyclic carboxylic acid anhydride of 4–7 carbon atoms,
         and
         b. styrene or substituted styrene;
         and
      2. at least one graft component comprising a polymer of
         a. an ester of acrylic acid or methacrylic acid with an alkanol of 1–24 carbon atoms;
         b. a vinyl ester of a carboxylic acid of 3–36 carbon atoms;
         or
         c. vinyl acetate;
   B. a pigment;
   and
   C. a non-reactive liquid carrier.

2. The dispersion of claim 1 wherein the backbone of the graft copolymer in (A) bears one or more free pendant carboxyl groups, amide groups, acid salt groups, amino groups or ester groups.

3. The dispersion of claim 1 wherein the cyclic anhydride in (A) (1) (a) is maleic anhydride.

4. The composition of claim 3 wherein the ethylenically unsaturated monomers in (A) (2) (a) are methyl methacrylate and 2-ethylhexyl acrylate.

5. The composition of claim 1 wherein the pigment is a hydrous iron oxide.

* * * * *